United States Patent [19]

Berrill

[11] Patent Number: 5,860,316
[45] Date of Patent: Jan. 19, 1999

[54] CAPACITANCE PROBE

[75] Inventor: Michael J. Berrill, Caithness, Scotland

[73] Assignee: Rolls-Royce and Associates Limited, Derby, England

[21] Appl. No.: 709,588

[22] Filed: Sep. 9, 1996

[30] Foreign Application Priority Data

Sep. 16, 1995 [GB] United Kingdom ................ 9519006

[51] Int. Cl.⁶ .................................................. G01F 23/00
[52] U.S. Cl. ........................................ 73/304 C; 340/620
[58] Field of Search ........................... 73/304 C; 340/620

[56] References Cited

U.S. PATENT DOCUMENTS

| | | |
|---|---|---|
| 2,868,015 | 1/1959 | Haropulos . |
| 3,283,577 | 11/1966 | Schuck ................................. 73/304 C |
| 3,343,415 | 9/1967 | Johnston ............................... 73/304 C |
| 3,935,739 | 2/1976 | Ells ...................................... 73/304 C |
| 4,002,996 | 1/1977 | Klebanoff et al. ................. 73/304 C X |
| 4,003,259 | 1/1977 | Hope .................................... 73/304 C |
| 4,099,167 | 7/1978 | Pomerantz et al. ............... 73/304 C X |
| 4,194,195 | 3/1980 | Merrell . |
| 4,266,144 | 5/1981 | Bristol ................................ 73/304 C X |
| 4,611,489 | 9/1986 | Spaargaren et al. .................. 73/304 C |
| 5,083,383 | 1/1992 | Heger . |
| 5,121,631 | 6/1992 | Koon .................................. 73/304 C X |
| 5,175,505 | 12/1992 | Magenau et al. ................... 73/304 C X |
| 5,399,979 | 3/1995 | Henderson et al. ............... 73/304 C X |
| 5,406,843 | 4/1995 | Hannan et al. ........................ 73/304 C |
| 5,427,136 | 6/1995 | Weishew . |
| 5,463,378 | 10/1995 | Gibb ................................. 73/304 C X |
| 5,554,937 | 9/1996 | Sanders et al. ................... 73/304 C X |
| 5,613,399 | 3/1997 | Hannan et al. ...................... 73/304 C |

FOREIGN PATENT DOCUMENTS

| | | | |
|---|---|---|---|
| 103-321-A | 3/1984 | European Pat. Off. ............. | 73/304 C |
| 1-223316 | 9/1989 | Japan .................................. | 73/304 C |
| 252649 | 5/1968 | Russian Federation ............. | 73/304 C |
| 1809319-A1 | 4/1993 | Russian Federation ............. | 73/304 C |
| 1831659-A3 | 7/1993 | Russian Federation ............. | 73/304 C |
| 1141153 | 1/1969 | United Kingdom . | |
| 2074325 | 10/1980 | United Kingdom . | |
| 2066961 | 7/1981 | United Kingdom . | |
| 2169082 | 7/1986 | United Kingdom . | |
| 2170602 | 8/1986 | United Kingdom . | |
| 2228329 | 8/1990 | United Kingdom . | |

Primary Examiner—Ronald L. Biegel
Assistant Examiner—Paul D. Amrozowicz
Attorney, Agent, or Firm—W. Warren Taltavull

[57] ABSTRACT

A proximity sensing apparatus comprising a capacitor and means for detecting the change in capacitance of the capacitor. The capacitor comprises two capacitive elements that are insulated from each other and are relatively movable. With at least one of the capacitive elements formed from an electrically conducting liquid. The capacitance detecting means operate as a switch in response to the change in capacitance producing a binary output. This output being combined with a series of other outputs from a series of such proximity sensors to form an apparatus to determine position of an object, particularly a liquid level.

12 Claims, 5 Drawing Sheets

5,860,316

CAPACITANCE PROBE

FIELD OF THE INVENTION

The present invention relates to position responsive apparatus, for example for monitoring a liquid level, and in particular to improvements to the sensing switches utilised within such apparatus.

BACKGROUND OF THE INVENTION

An apparatus using an array of sensing switches to measure a liquid level is well known and one example is described in UK patent application No. 9208749.3, which has been published as PCT/GB92/01601. The apparatus described employs a vertical array of magnetic switches which are operated by means of a magnet carried by a float. Such switches have an on-off operation so that they provide stepped measurements of the liquid level, which is not necessarily a disadvantage if the steps are sufficiently small. The use of a magnetic float arrangement in some circumstances may not be desirable and so a different method is required.

Another apparatus including a capacitance sensing arrangement, which does not use a floating magnet, is also well known. These arrangements generally do not operate in a switching stepped method. Instead they measure the changes in the total capacitance of a suitable probe as it varies with the fluid level. This arrangement has the disadvantage that the capacitance measured varies with such parameters as dissolved chemical concentration, tank shape and temperature conditions. Additionally this arrangement does not produce a linear relationship and requires frequent calibration.

SUMMARY OF THE INVENTION

An object of the present invention is to provide a means for measuring a liquid level that does not require a magnetic float and which does not have the disadvantages of present capacitance measuring methods.

According to the present invention a proximity sensing apparatus comprises a capacitor and means for detecting the change in capacitance of the capacitor, the capacitor comprising two capacitive elements insulated from each other, the elements being relatively movable, and at least one of the elements being formed by an electrically conducting liquid.

Preferably one of the capacitive elements is fixed.

Preferably the apparatus for detecting change in capacitance of the capacitor element comprises a comparison means which produces a binary step output dependent upon the comparison of the capacitance of the capacitor element, either directly or indirectly, against a threshold.

Furthermore the apparatus comprises a series of such proximity sensing devices disposed in succession along the required measurable positional path and adapted such that proximity to each individual sensing element causes a change in the capacitance of a capacitor element within the proximity sensing devices, the binary output from each individual sensing device within the series of proximity sensing devices being combined to produce a cumulative output which represents the position of an object.

Accordingly the two capacitive elements within the proximity sensing device are arranged to come into close proximity and temporarily operate as a capacitor.

The apparatus for detecting the change in capacitance comprises a comparison means which produces the binary response dependent upon the comparison of the capacitance of the capacitor, either directly or indirectly, against a threshold.

Preferably within the comparison means of the proximity sensing device there is an electrical charging means which is connected to the capacitor and additionally to a second capacitor, and a comparator means arranged to compare the voltage produced across the second capacitor with a threshold voltage and to switch between two output conditions.

Accordingly the means for detecting the change in capacitance of the capacitor is mounted within an inner container, on a part of the exterior of the inner container one of the elements of the capacitor is affixed, said element is insulated from the other element by an outer container or part thereof which encloses the said element and the inner container, said outer container being made from a suitable electrically non conducting material which is of such dimensions that a capacitor can be formed between the two elements of the capacitor arranged on opposite sides of the outer container.

Preferably it is the position of a liquid level that is being determined.

The present invention also provides an apparatus comprising a series of proximity sensing devices disposed in succession along the required measurable positional path and adapted such that proximity to each individual sensing element causes a change in the capacitance of a capacitor element within the proximity sensing devices, means for detecting the change in capacitance producing, either directly or indirectly, a binary output response from the proximity sensing device, the binary output from each individual sensing device within the series of proximity sensing devices being combined to produce a cumulative output which represents the position of an object.

BRIEF DESCRIPTION OF THE DRAWINGS

By way of example the invention will now be described with reference to the accompanying drawings in which.

DETAILED DESCRIPTION OF THE INVENTION

Figure 1:
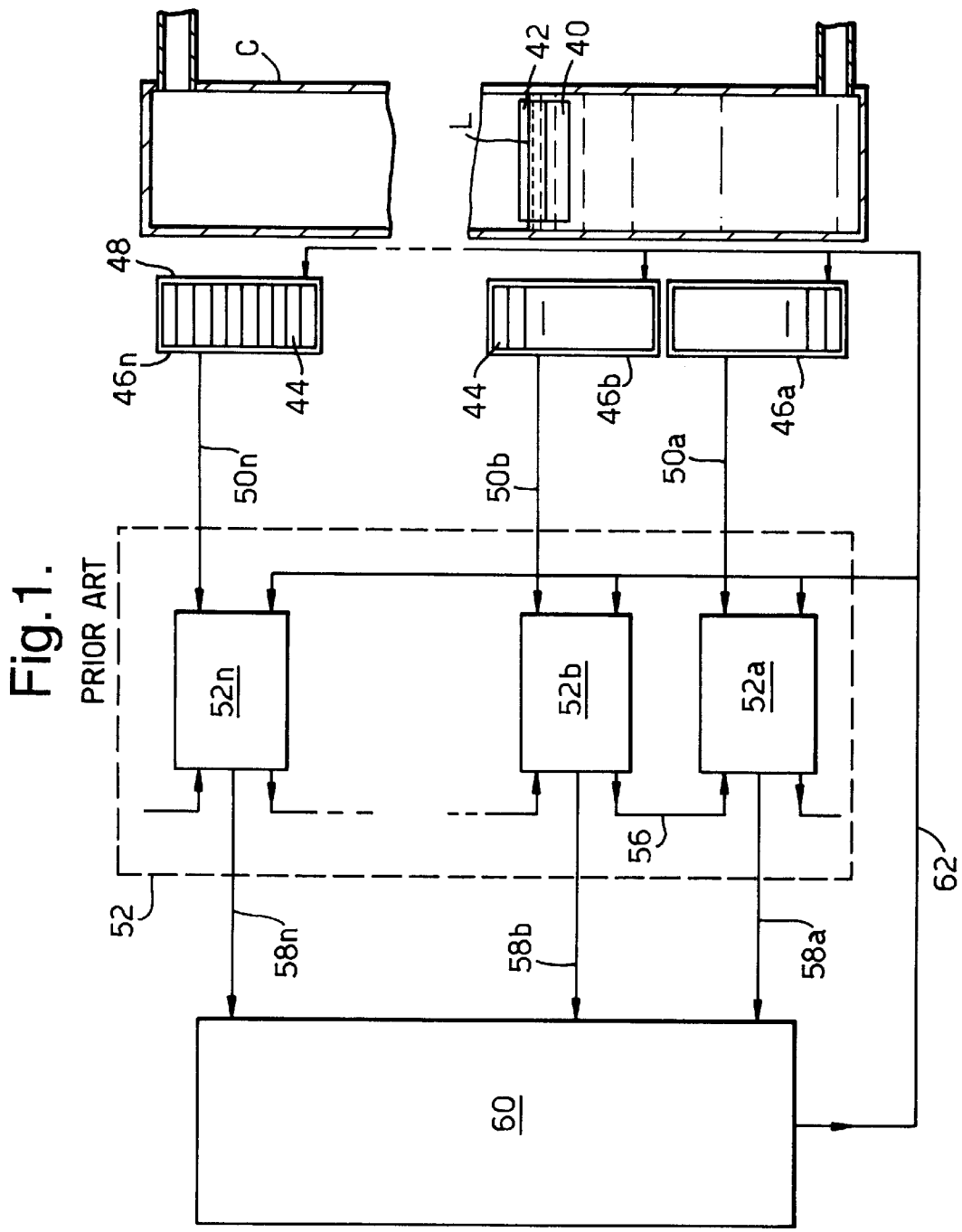
FIG. 1 is a block diagram of one form of the apparatus described in UK patent application 9208749.3.

Referring to FIG. 1, and the aforementioned patent application, which is incorporated herein by reference. The conventional Hall-effect (magnetic) probes 46 measure the liquid level L using action of a floating magnet 40 on a vertical series of sensors 44 disposed at equal height intervals adjacent and parallel to the column, stand pipe, or tank C. The sensors 44 are contained in a series of discrete elongate probes 46 identical to each other and arranged end to end to extend over the required height of the column C. Each probe 46 contains a series array of individual sensors 44. The probe 46 produces an output signal 50 based upon the individual sensor 44 readings. This output 50 is processed by the remainder of the apparatus 52,60, as described in UK patent application 9208749.3, to give a measurement of the liquid level. Power supply and control signals are supplied to the probes 46 by connections indicated generally by the reference 62.

Figure 2:
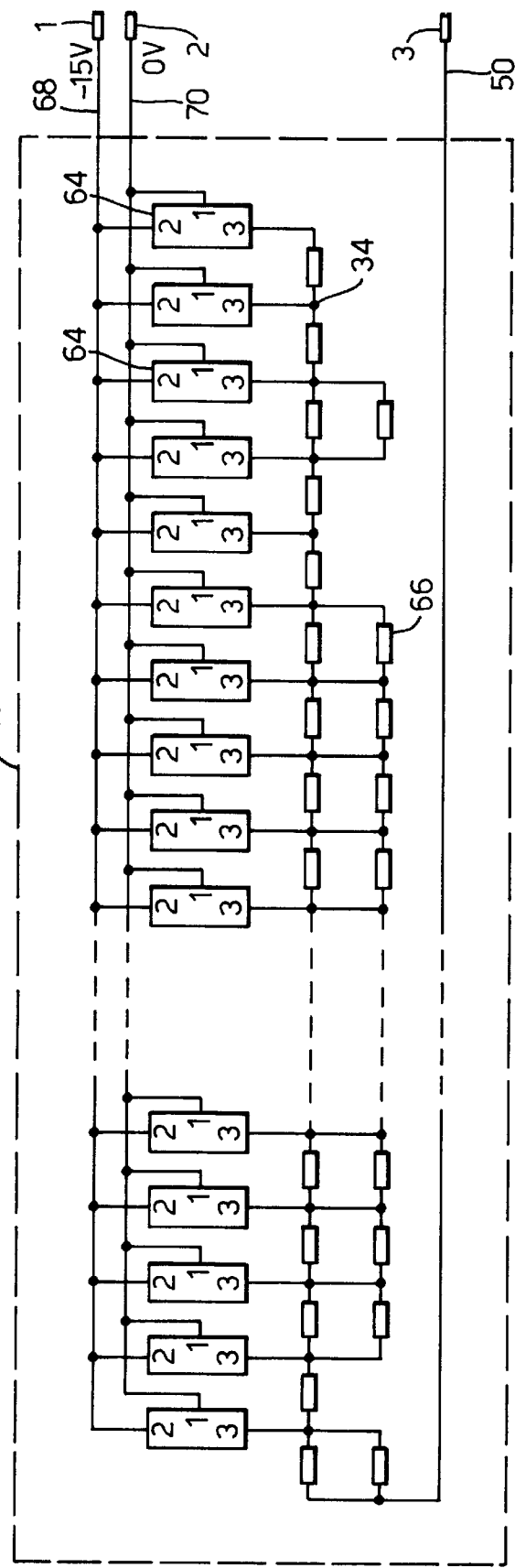
FIG. 2 is a circuit diagram for an array of position detecting elements in the apparatus of FIGS. 1 and 3.

FIG. 2 illustrates the circuit of a probe 46 in more detail. According to the prior application, along the length of the probe 46 are arranged a series of Hall-effect switches 64 which make up the series of sensors 44, and a series chain of resistors 66. The switches 64 are connected in parallel across −15V and 0V supply lines of the conductors 68,70. Each switch 64 also has an output terminal connected to the chain of resistors 66, the successive connections 34 being made to successive stages in the chain. The output signal line 50 is connected to the end of the resistor chain 66 at the top of the probe 46.

Figure 3:
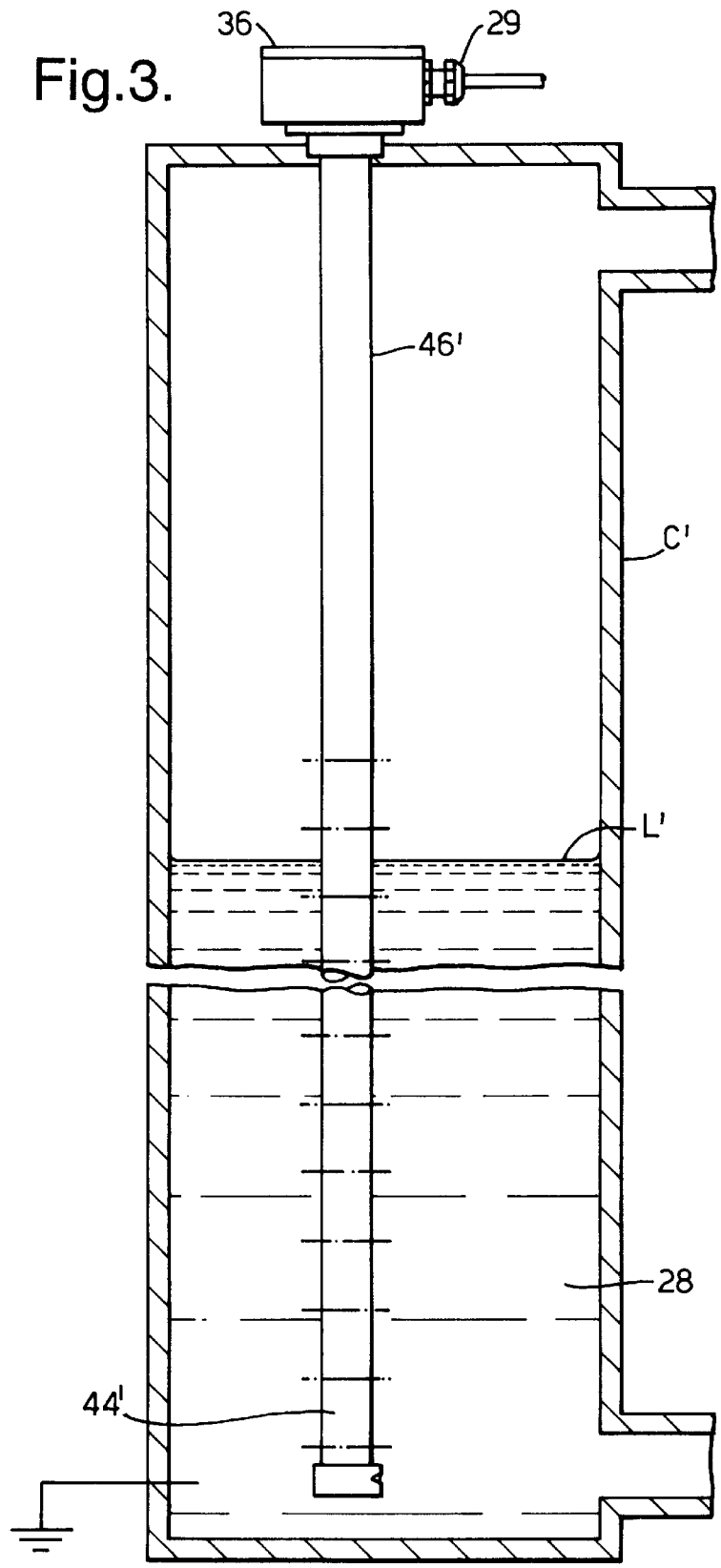
FIG. 3 is a schematic of a probe for use with the apparatus of FIG. 1 showing one form of the present invention.

The present invention is shown in FIG. 3 and utilises essentially the same apparatus as that described in FIG. 1 and the aforementioned application. However the probes 46, using Hall-effect switches 64, are replaced by capacitance probes 46' using capacitance switch means 64'. The operation of the capacitance switch means will become clear later in this description. The internal circuitry of the new probe 46' is similar to that of the conventional Hall-effect probe 46 as shown in FIG. 2. The difference between the probe 46 of the prior art, and the probe 46' according to the present invention being that the switches 64 are capacitive rather than magnetic in action. The switches 64', of the present invention, require a different probe construction with the probe 46' being of a 'dipstick' type in this embodiment. To operate, the probe 46' is immersed vertically in the column, stand pipe, or tank C' containing the liquid 28 as is shown in FIG. 3.

The probe 46' operates in a similar fashion to the conventional probe 46. When the liquid level L' is below the probe 46' no liquid 28 will be in proximity to any of the switches 64'. All the switches are off and no signal appears on the output line 50. As the liquid level L' rises it will come into proximity with the lowermost switch, thereby closing the switch 64'. This will connect the −15V supply line 68 to the output line 50 through the chain of resistors 66. As the level L' moves upwards successive individual switches 64' are closed. This successively decreases the portion of the resistance chain 66 in circuit with the supply voltage and an increasing voltage signal is thus obtained on the output line 50. The output line 50 from each probe 46' connects to ground through a respective shunt resistor (not shown) in the control unit 52,60. The value of the shunt resistor is set to give a maximum probe signal output of −5.5V. Along the chain of resistors 66 the resistance steps between each switch 64' of the probe 46' are selected to give an equal change in the shunt resistor current for each step. By the above arrangement, a capacitance switched probe 46' is compatible with the electrical connections and signal processing described in the aforementioned application. The capacitance probe 46' can therefore be readily exchanged with the conventional Hall effect type of probe 46 and used with the conventional apparatus.

Figure 5:
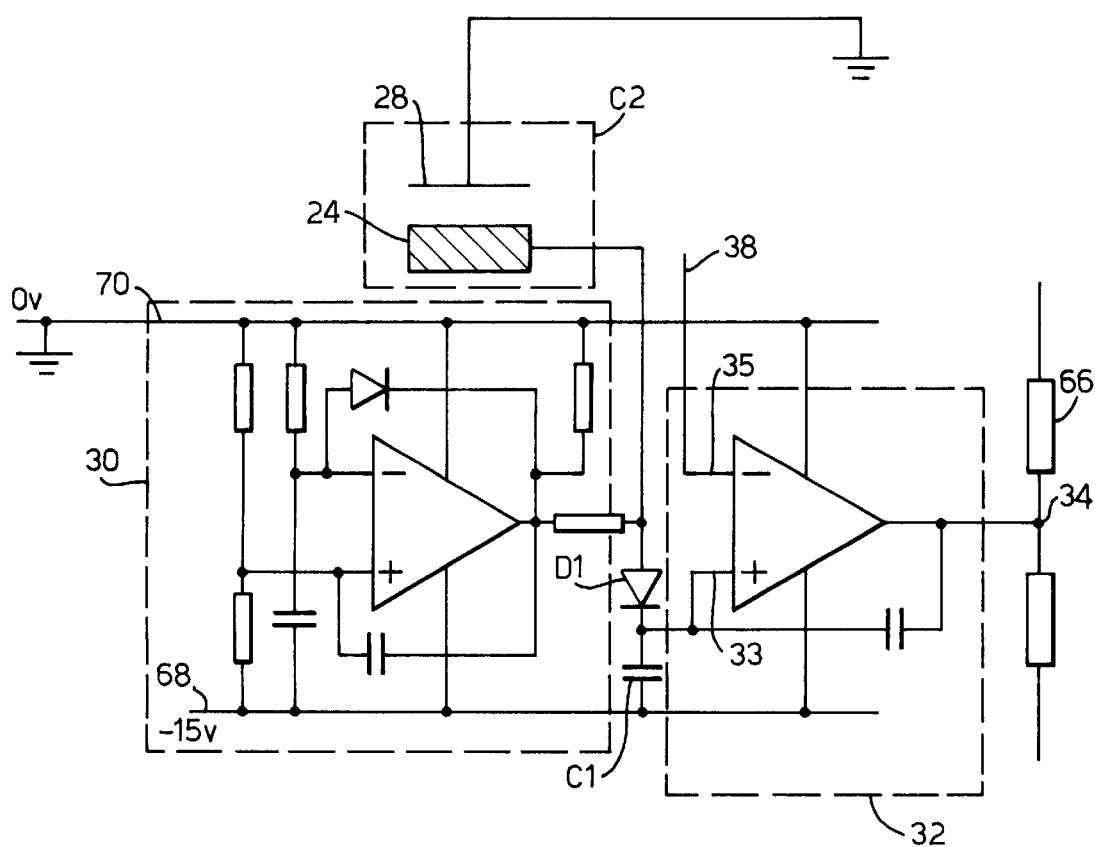
FIG. 5 is a circuit diagram of the sensing switches shown in FIG. 2 and 3 incorporating the present invention.

Referring now to the circuit diagram of the sensing switches shown in FIG. 5. The capacitive switch 64' operates using an oscillator section 30 that charges up a capacitor Cl. The charge on this capacitor Cl provides a bias voltage at the non-inverting input 33 of a comparator section 32. This holds the comparator 32 in a 'high' state with the output at the high 0V supply voltage. This 0V output signal appears at the connection 34 to the resistor chain 66. However, since the output line 50 is also connected to ground (0V) no current is drawn through the resistor chain 66 and the switch 64' as a whole is thus in an open or off state. A single insulated copper plate 24 is connected to the oscillator charging section 30. The presence of an earthed conducting or partially conducting medium, such as the liquid 28, adjacent to but insulated from the copper plate 24 will form a second capacitor C2, with the earthed conducting medium 28 and copper plate 24 forming opposite plates of the second capacitor C2. Once formed capacitor C2 will effect a capacitive leakage from the copper plate 24, through the conducting medium, back to earth (0V). This removes or lowers the drive to diode D1, so preventing or reducing the charge up of the capacitor C1. This will remove or lower the bias voltage applied at the non-inverting input 33 of the comparator section 32. A reference voltage is set at the inverting input 35 of the comparator 32 by a sensitivity control unit 36 linked to the switch 64 by connection 38. If the bias voltage falls below that set at the inverting comparator input 35 then the comparator 32 will switch to a 'low' state thereby conducting the −15V supply voltage 68 to the resistor chain 66 at connection 34. This provides a voltage potential at the connection 34 to draw current through the resistor chain 66 and produces an output signal on the output line 50. The switch 64' as a whole will now be in a closed or on state.

The use of the liquid 28 as one plate of a capacitor C2 and also as an electrical connection (in this embodiment to ground (0V)) requires that the liquid 28 must be conductive to some degree. Suitable liquids include for example any aqueous liquid, water carrying solids such as grain or damp metallic ores, or crude oils provided there are sufficient conductive impurities.

The sensitivity control unit 36 is mounted with the probe 46' and sets an adjustable reference voltage for the comparator 32 of each switch 64'. As described above this determines at what point the switch 64' will operate. The unit 36 allows the probe 46' to be adjusted to operate with different conducting media and under differing conditions; for example different temperatures, concentrations, tank shapes, etc. It also allows the probe 46', and each switch 64' within the probe 46', to be calibrated to operate at consistent and compatible points.

Figure 4:
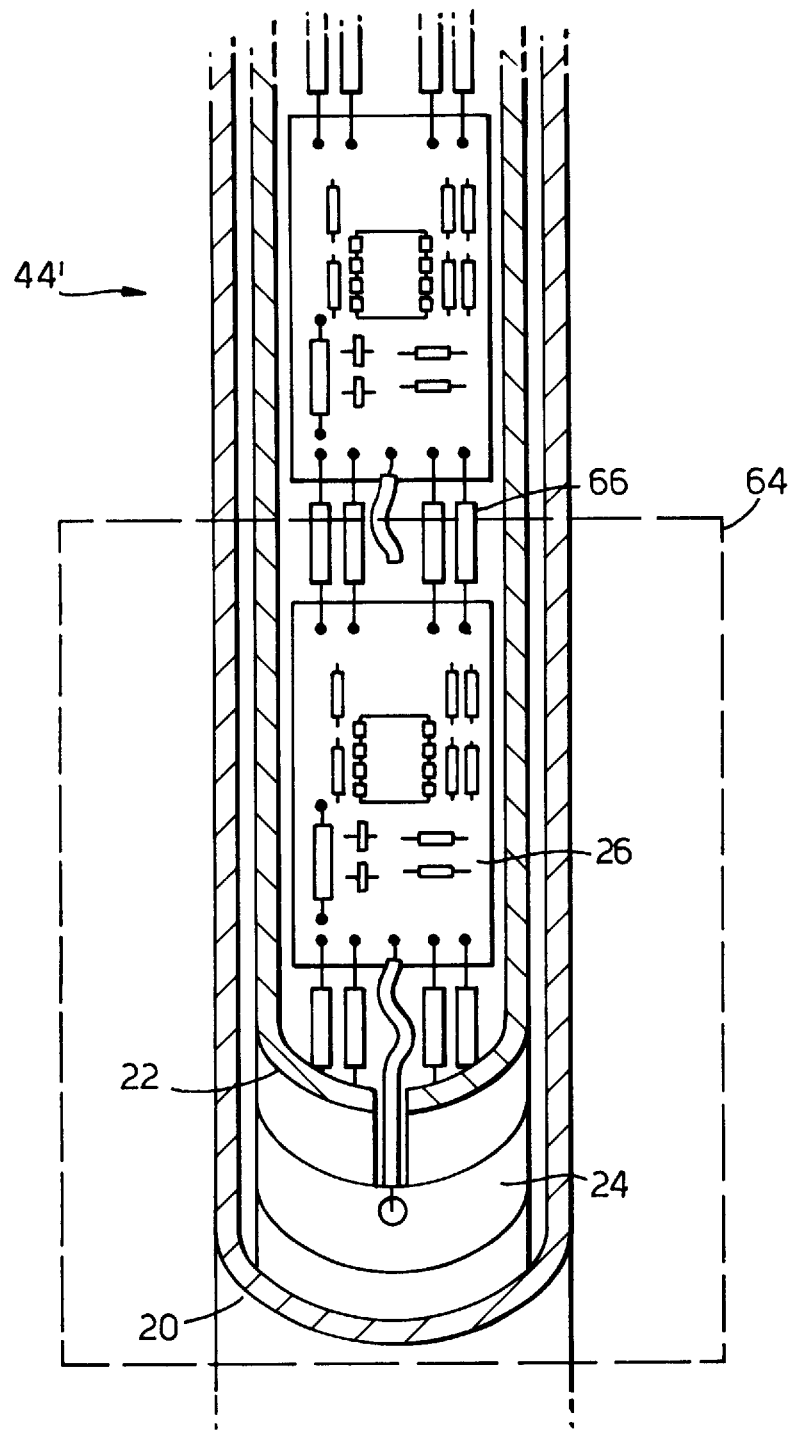
FIG. 4 is an enlargement of one of the sensing elements shown in FIG. 3.

Referring to FIGS. 3 and 4 a series of capacitive switches 64', making up an array of sensors 44', are mounted equispaced along the length of an inner tube 22, made for example from a plastic like ABS (Acrilonitrile Butadiene Styrene) or Nylon, forming the probe 46'. The electronics 26 of the switches 64' and the resistor chain 66 to which they are connected are encapsulated within the inner tube 22. The copper plates 24 for each switch 64' are mounted adjacent to their respective electronics 26 on the exterior of the inner tube 22, again at equally spaced distances along the probe 46'. The copper plates 24 are, for example, produced from copper tape wrapped around the inner tube 22 to form a band around the exterior of the inner tube 22 as shown. The copper plates 24, so formed, are insulated from the liquid 28 by an outer tube 20 which encloses the inner tube 22 and is sealed at either end. It is important that the outer tube 20 is made from an electrically insulating material so that a capacitor C2 can be formed with the insulating material between the two capacitor plates, as required. In this embodiment the outer tube is also made of ABS plastic or Nylon. The sensitivity control unit 36 and a connector means 29, for the power supply 68,70 and output line 50, required by the probe 46' are all mounted at the top of the probe 46' as shown. The probe 46' can thereby be easily connected to the remainder of the measuring apparatus 52,60 described with reference to FIGS. 1 and the prior application.

A capacitance probe 46' as described offers the considerable advantage over the Hall-effect probe 46 in that it does not require a floating magnet 40 to activate the switches 64,64'. As described the capacitance probe 46' must be placed within the liquid container C' in a 'dipstick' fashion, rather than being external to the container C. However other arrangements with the probe 46' mounted in the tank C walls are possible, provided that the sensors 44 are electrically insulated from the liquid 28, and that the two plates 24,28 of the formed capacitor C2 are not separated by an excessive distance.

In the present embodiment a 'dipstick' type probe 46' with the outer probe casing 20 made from an electrically insulating material, typically a plastic, may prevent its use for measurement at high temperatures and/or high pressures. However other materials could be used, for example a ceramic, that would allow the probe 46' to operate at higher temperatures.

It will be appreciated that the capacitance probe 46' described above is considerably different from the conventional capacitance probes. Conventionally a capacitance probe measuring fluid level operates by measuring the change in capacitance as different fluid levels act upon the plates of a capacitor. This change in total, absolute capacitance is calibrated against liquid depth or position to give the measurement required. The result tends to produce a non-linear scale and a probe that is very sensitive to liquid and tank parameters. Using the present invention the value of the capacitance produced by the action of the fluid or conducting medium upon the plates of a capacitor is not critical. It only has to be sufficient to exceed a set, adjustable threshold whereby it will be registered. The use of a series of capacitors so operating, connected to switching a resistor chain, as described, produces an advantageous linear measurement scale set by a resistor chain.

It will be appreciated that the detailed arrangement of the apparatus described is only one exemplary configuration and that other arrangements are possible which would still follow the principle of the invention. An additional example includes an arrangement where the probe is movable relative to the liquid with the probe being inserted and withdrawn from the liquid level. In this case the measurement produced is one of the probe depth rather than liquid level.

It will further be appreciated that although the invention has been described by its application to a liquid level indicator it will be understood that it is capable of being employed for other kinds of position indication, including rotary position. However in other applications the conducting medium provided by the liquid in this embodiment will be replaced by another suitable means.

I claim:

1. A proximity sensor apparatus comprising a capacitor and means for detecting the change in capacitance of the capacitor, said capacitor comprising two capacitive elements and insulation means, said elements being movable relative to each other and being insulated from each other by said insulation means, at least one of the capacitive elements being formed by an electrically conducting liquid, said apparatus further comprising an inner and outer container, the outer container being made from a suitable electrically non-conducting material, said inner container being fitted inside and substantially surrounded by said outer container, within said inner container being mounted the means for detecting the change in capacitance of the capacitor, on a part of the exterior of the said inner container one of the elements of the capacitor being affixed, the other capacitor element being disposed outside said outer container, the outer container thereby providing the insulation means between the two capacitive elements, the outer container also being of such dimensions and construction that a capacitor can be formed between the two said capacitor elements of the capacitor.

2. Proximity sensing apparatus as claimed in claim 1 in which one of the said capacitive elements is fixed.

3. Proximity sensing apparatus as claimed in claim 1 in which the two capacitive elements within the proximity sensing device are arranged to come into close proximity and operate temporarily as a capacitor.

4. Proximity sensing apparatus as claimed in claim 1 wherein suitable means set a threshold value and the means for deteting change in capacitance of the capacitor element comprises a comparison means, a binary output being produced by said comparison means, this output being dependent upon a comparison of the capacitance of the capacitor element against the set threshold value.

5. Proximity sensing apparatus wherein said series of proximity sensing devices as claimed in claim 1, with said devices disposed in succession along a required measurable positional path, the proximity sensing devices being adapted such that proximity to each individual sensing element causes a change in the capacitance at a capacitor element within the proximity sensing devices, a binary output being produced from each of the individual sensing devices within the series of proximity sensing devices, this binary output being combined to produce a cumulative output which represents a position on the said path.

6. Proximity sensing apparatus as claimed in claim 5 in which the two capacitive elements of the proximity sensing device are arranged to come into close proximity and operate temporarily as a capacitor.

7. Proximity sensing apparatus as claimed in claim 5 wherein suitable means set a threshold value and the means for detecting change in capacitance of the capacitor element comprises a comparison means, a binary output being produced by said comparison means, this output being dependent upon the comparison of the capacitance of the capacitor element against the set threshold value.

8. Proximity sensing apparatus as claimed in claim 7 wherein the means for detecting change in capacitance comprises an electrical charging means and a second capacitor, the electrical charging means being connected to both said capacitors such that a voltage is produced across the second capacitor which is dependent upon the capacitance of the first capacitor, the comparison means being arranged to compare the said voltage against the threshold and produce the binary output in response.

9. Proximity sensing apparatus according to claim 1 which is adapted to determine the proximity of a liquid level.

10. Proximity sensing apparatus as claimed in claim 8 in which said charging means comprises an oscillator.

11. A proximity sensor apparatus comprising a capacitor and means for detecting the change in capacitance of the capacitor, said capacitor comprising two capacitive elements and insulation means, said elements being movable relative to each other and being insulated from each other by said insulation means, at least one of the capacitive elements being formed by an electrically conducting liquid, the other capacitive element forming a unit with said means for detecting, said other capacitive element and said means for detecting being associated with one another on a common support member to minimize the distance between them.

12. A proximity sensor apparatus comprising a capacitor and means for detecting the change in capacitance of the capacitor, said capacitor comprising two capacitive elements and insulation means, said elements being movable relative to each other and being insulated from each other by said insulation means, at least one of the capacitive elements being formed by an electrically conducting liquid, said apparatus further comprising first and second spaced apart support members, the second support member being made from a suitable electrically non conducting material, said first support member being substantially surrounded by said second support member, said means for detecting the change in capacitance of the capacitor being mounted on said first support member, on a part of said first support member one of the elements of the capacitor being affixed, the other capacitive element being disposed on said second support member, said second support member thereby providing the insulation means between the two capacitive elements, the second support member also being of such dimensions and construction that a capacitor can be formed between the two said capacitive elements of the capacitor.

* * * * *